United States Patent [19]

Bodkin, Sr.

[11] Patent Number: 5,813,132
[45] Date of Patent: Sep. 29, 1998

[54] HEIGHT MEASURING DEVICE

[76] Inventor: Lawrence Edward Bodkin, Sr., P.O. Box 16482, 1149 Molokai Rd., Jacksonville, Fla. 32216

[21] Appl. No.: 672,408

[22] Filed: Jun. 28, 1996

[51] Int. Cl.$^6$ ............... G01B 3/10; G01C 5/00
[52] U.S. Cl. ............... 33/759; 33/832; 33/512; 33/494
[58] Field of Search ............... 33/759, 755, 757, 33/832, 512, 494, 679.1

[56] References Cited

U.S. PATENT DOCUMENTS

| | | | |
|---|---|---|---|
| 1,623,406 | 4/1927 | Hand | 33/759 |
| 1,974,085 | 9/1934 | Shields et al. | 33/512 |
| 1,983,966 | 12/1934 | Boyd | 33/512 |
| 2,215,884 | 9/1940 | Runge | 33/512 |
| 2,338,001 | 12/1943 | Vigne | 33/832 |
| 2,381,428 | 8/1945 | Attick | 33/759 |
| 2,705,839 | 4/1955 | Keppler et al. | 33/759 |
| 2,705,840 | 4/1955 | Keppler et al. | 33/512 |

FOREIGN PATENT DOCUMENTS 314922  10/1919  Germany .................. 33/759

*Primary Examiner*—Christopher W. Fulton
*Attorney, Agent, or Firm*—Arthur G. Yeager

[57] ABSTRACT

A device that is simply pulled down to touch the head of a child to quickly and accurately determine their height, employs a special extendable and retractable measuring tape that is wall mounted at a specific height over the floor and stays up and out of the normal reach of a small child when not in use. Reading is direct from the tape pulled from a holder. The numbering system of the tape of this device is reversed from tapes conventionally used to measure length, by having the highest number of measurement located at the outer end and decreasing incrementally toward a zero reading nearest the end secured within the holder. The device is properly mounted by extending the tape to the zero reading and securing it at a height on the wall that allows the device, with the tape so extended, to touch the floor directly below it.

13 Claims, 2 Drawing Sheets

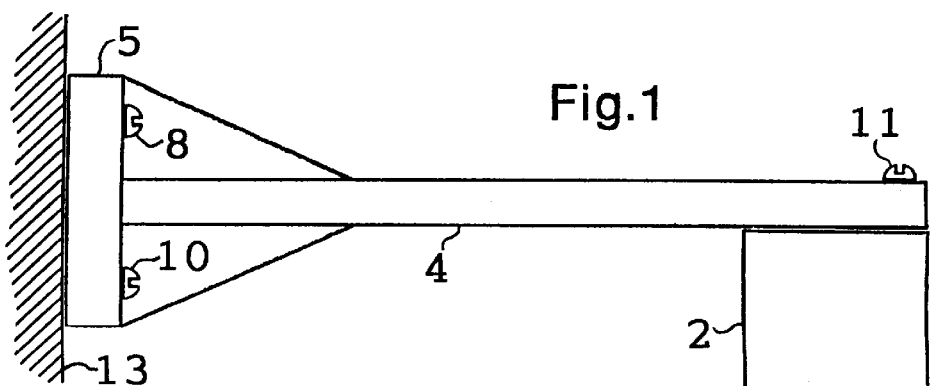
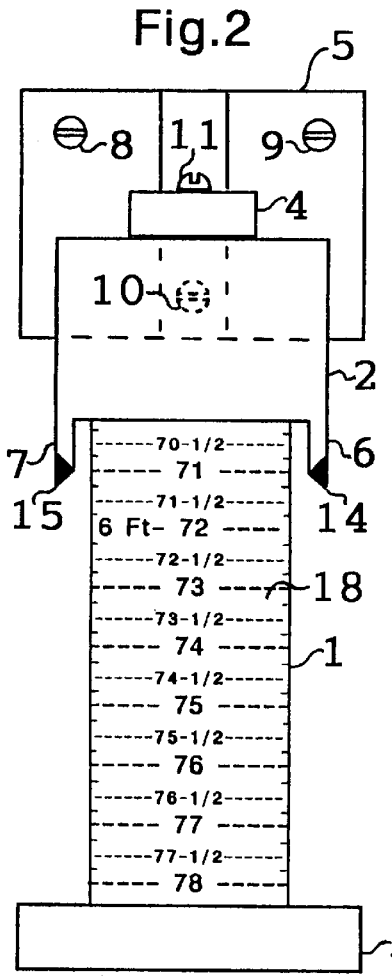
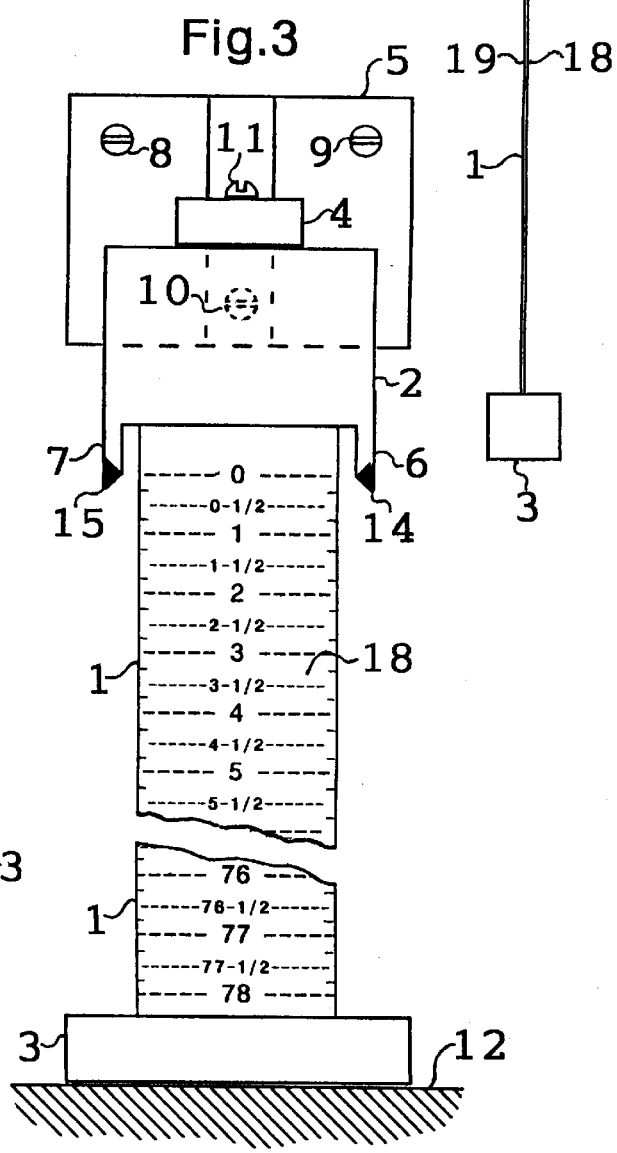

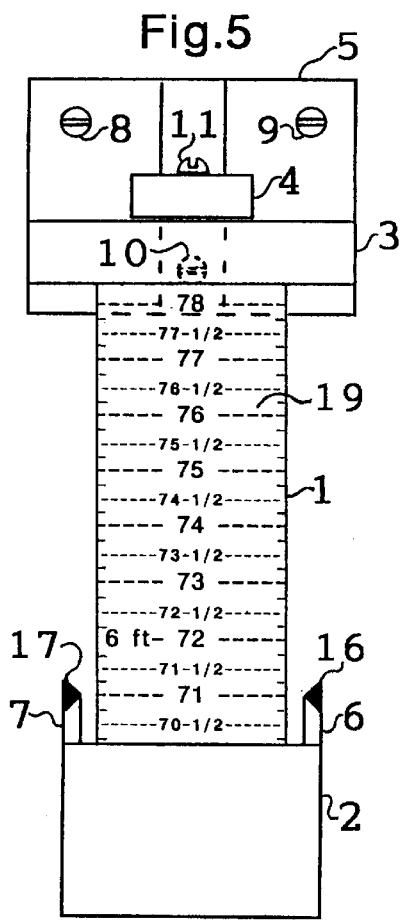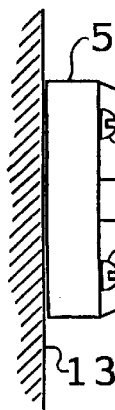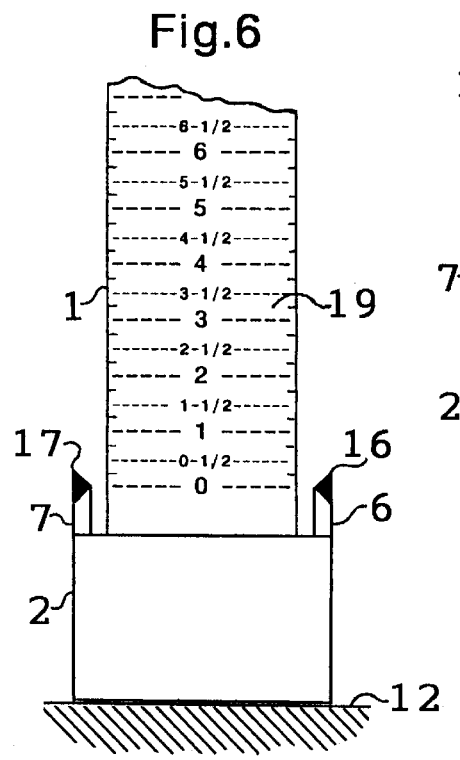

HEIGHT MEASURING DEVICE

BACKGROUND OF THE INVENTION

In the simpler systems for measurement of a person's height, such as those designed for home use, wall-mounted charts with rulings are employed which require that a flat accessory piece be placed on the top of the person's head and extended horizontally to the ruling to obtain any acceptable degree of accuracy. Making sure that the piece is horizontal is essential and can be a difficult achievement if the person to be measured is an active, perhaps uncooperative child, who prefers to direct their attention elsewhere. The head and hair often make the wall ruling hard to see or to mark. In short, maintaining the total relationship of ruling, child, and horizontal piece may tend to make accurate reading difficult, if not impossible. As with many other things, such inconvenience is accepted when nothing more convenient appears to be available.

The more sophisticated professional devices, traditionally found in medical facilities and usually mounted on the weight scale, consist of an indexed, vertically telescoping rod, equipped with an attachment that is hinged at a right angle to provide the required horizontal contact with a person's head. While these are less troublesome in providing a substantial degree of accuracy they are not well suited to use in the home. They are also relatively expensive and heavy and must either be stored when not in use or allowed to occupy valuable living space.

There is an apparent need for a reasonably priced measuring device that provides conveniently rapid and accurate height information. One that can be kept ready for immediate use and yet, at the same time, be kept out of a child's reach.

SUMMARY OF THE INVENTION

The applicant's invention provides an easily read, accurate determination of height that requires only seconds to accomplish. In the preferred embodiment, it is intended for semi-permanent installation on the wall and is protected, while awaiting use, by being located over six feet above the floor and therefore out of the normal reach of small children. While primarily designed for use in the home, it is expected to find widespread use in physician's offices. With a child standing below the wall-mounted tape, the tape is simply pulled down to the top of the child's head and their height directly read at the holder. Having the child standing with a normally erect posture and not braced flat against the wall or one of the wall-mounted charts, so frequently used in the home, also provides a more realistic indication of true height.

The applicant's device comprises a retractable and extendable measuring tape that differs from conventional tapes of this general type in the direction of its numbering sequence. Instead of beginning with the lowest numerical indication of measurement at the outer, extendable end of the tape, with incremental increases toward the end secured in the case or holder, the tape of the applicant's invention indicates the maximum measurement capacity at its outer, extendable end and has incremental decreases toward the end secured on the holder, with a final indication of zero. This difference enables the tape to be used in what the applicant calls a Subtractive Method of measurement. When used between two fixed positions, having a fixed space of separation, equal to the length of the tape when linearly extended to the zero reading, this tape can be made to indicate a linear dimension of an object placed between the said two positions, when the object is placed in contact with one position and the retracted tape extended from the other position to fill the remainder of the space.

The invention includes bracket means for fixing a portion of the said device to define one of the said two positions on a first surface, usually a wall, that is substantially at right angles to a second surface that is usually a floor or platform surmounting a floor. The second of the two said positions can then be defined as a limited area on the second surface, upon which a person is to stand or an object is to be placed for measurement. The said one position, of the two said positions, is determined by bracket placement on the first said surface that permits the tape to reach the second position on the second surface, when the tape is linearly extended to read a dimension of zero. When properly positioned, tape retraction of one inch to accomodate an object having a one inch dimension, in a direction generally indicated by a line drawn between the two said positions, results in a reading of one inch at the holder. Retraction to accommodate an article measuring fifteen inches, provides a reading of fifteen inches etc.

In most other aspects, the measuring tape of the applicant's invention is like that of more conventional measuring tapes. Like the conventional tapes, the flexible tape element of the applicant's invention may be made of many materials such as plastic, paper, cloth or metal and it may be secured in an included holder, herein substantially represented in a generic form, that can be an enclosing case or an open framework which can be made of various materials such as metal or polymer resins. Also, as in conventional measuring tapes, the flexible tape element may be spring-loaded for automatic retraction, manually rewound by means of a crank or, if made rigid enough, be capable of being simply pushed back into its case. It may be also include a conventional locking means to retain a tape position of measurement and it may be made narrow and less obtrusive or be made as wide as a window shade to allow space for a complete height diary and parental comments.

In the preferred embodiment, the tape may be attached to the tape positioning bracket in two alternative ways, according to the preference of the user, and the manner of attachment may be changed at will. The tape holder can be attached to the bracket and the tape end lowered in measurement. Alternately, the end of the flexible tape element can be attached to the bracket and the tape holder lowered in measurement. In the preferred embodiment, the tape is printed on both sides with the same numbering sequence but printed with the numerals printed to be read from different viewing directions.

A small disc-shaped panel, mat, or pad of minimal or negligible thickness may be furnished with the device or supplied by the user to serve as a marker to indicate a proper standing position when placed on the floor directly below the tape position. References in this application to the floor are meant to include such surmounting surfaces as these or of platforms that become the standing surface or "floor" with reference to height measurement. When of any appreciable thickness these items must be taken into account when locating the mounting height of the tape on the wall.

While the tape, as shown, measures only in inches and feet, it will be appreciated that this scale can be limited to one edge on each side of the flexible element, while the other edge can be made to read in centimeters and meters.

Since most interior doors tend to be of standard size, a special bracket that requires only minor adjustment provisions, can be made to temporarily secure the tape to the top of a door at the proper distance from the floor. This is not generally preferred, since vigorous opening and closing of the door could be abusive to the device, and removal and storage between usages to prevent such abuse would tend to eliminate the convenience of immediate availability.

While a capacity of five feet or less would be sufficient for the measurment of children, providing a capacity of six feet or more not only extends the usefulness to the measurment of most adults, but perhaps more importantly, it requires that wall placement be high enough to make it generally inaccessible to young children.

A primary object of this invention is to provide a device that makes accurate measurement of height faster and more convenient. Another object is to provide such a measuring device that may be kept readily accessible at all times and conveniently ready for immediate use.

Still another object is to provide such a device that may be automatically kept out of the normal reach of small children when not in use.

A further object is to provide such a measuring device that may be made to include means for recording a height history with dates and parental comments.

A still further object is to provide such a device that may be manufactured at low cost so that it may be made generally available.

BRIEF DESCRIPTION OF THE DRAWINGS

The invention, both as to its organization and principles of operation, together with further objects and advantages thereof, may be better understood by reference to the following detailed description of the embodiments of the invention, taken in conjunction with the accompanying drawings in which:

FIG. 1 depicts a side view of a measuring tape, made in accordance with this invention, with the tape partially extended from its holder and with the holder attached to a bracket that is in turn mounted on a wall.

FIG. 2 is an end view of the arrangement shown in FIG. 1, in which the numbering sequence or order, printed on one side of the tape, is visible.

FIG. 3 is an end view like that of FIG. 2, but shows the tape element fully extended in linear fashion and shown in broken form to omit the central majority of the tape length, reading zero at the holder and shown with the end piece of the tape in contact with a floor or platform..

FIG. 4 is a side view like that of FIG. 1, which shows the tape and bracket assembly in an alternate arrangement for securing the tape to the bracket, wherein the end piece of the outer, extendable end of the tape, instead of the tape holder, is secured to the bracket.

FIG. 5 is a front view of the arrangement in FIG. 4, showing the other side of the tape element to have the same reversed number sequence as shown in FIGS. 2 & 3, but with the printing of the numbers reversed in the direction of their reading, in order to be more properly read with the holder inverted from the position shown in FIGS. 1–3.

FIG. 6 is an end view, like that of FIG. 5, but showing the tape element, with central portion omitted, fully extended in linear fashion and reading zero, at the tape holder markers, as the tape simultaneously touches the floor or standing platform.

DESCRIPTION OF THE PREFERRED EMBODIMENTS

Referring now to FIG. 1, flexible measuring tape element 1 is shown partially extended from holder 2 and with its outer end terminated by tape end piece 3. The tape holder is secured by screw 11 to the end of the projecting tape support section 4 of the tape bracket 4,5 which extends from wall 13, where its attachment section 5 is secured by means of visible attachment screws 8 and 10. This is the first of two alternative modes of tape and bracket assembly, and one which is generally preferred wherein a measurement reading nearer adult eye level may be considered desirable and bending is not already required to position the person to be measured.

In FIG. 2, we see the bracket 4,5 as viewed from the end, showing the bracket section 5 attached to wall 13 by screw 8, previously concealed screw 9 and, in dotted lines, the now concealed attachment screw 10. FIG. 2 also shows tape holder 2 attached by screw 11 to the tape support section 4 of the bracket 4,5, and shows the numbering sequence of measuring tape element 1, indicating a maximum measuring capacity of the tape shown as 78 inches with the numerical indication of such maximum measurement located nearest the end piece 3 of tape element 1, and with numerical values descending toward the tape holder 2 to provide a reading at markers 14 and 15 on holder projections 6 & 7 respectively, that indicates a height measurement of 71 inches.

FIG. 3 shows the same end view as FIG. 2, but with the tape element 1 fully extended, in linear fashion, reading zero at markers 14 and 15 on holder projections 6 and 7 respectively and with its end piece 3 in contact with the floor or platform 12 directly beneath the holder 2, where the object or person to be measured will be placed. The tape element 1 is shown broken to omit the majority of the space consuming central length of tape element 1 in the drawing. To produce accurate readings, the bracket 4,5 must be positioned on wall 13 so that end piece 3 of tape element 1, when extended in this linear fashion to read zero, reaches the upper surface of the floor or platform 12 below it.

In the side view of FIG. 4, which corresponds to that of FIG. 1, the alternate method of attaching the tape to the bracket comprising 4 & 5 is shown, wherein the end piece 3 at the exterior end of the tape element 1, is secured to the bracket in place of the tape holder. This enables the user to lower the tape holder to the top of the person's head for the reading and to make the reading near the level of the person's head rather than high above it. This can be preferable when measuring particularly small children, and where bending or stooping is already a requirement and cannot be avoided. This may also be preferred by adults, who do the measuring, when they are either relatively short in stature or prefer to sit while measuring and find it inconvenient to look up to obtain a measurement reading on a bracket mounted tape holder.

FIG. 5 is a front view of the arrangement in FIG. 4, showing the other side of the tape shown in FIGS. 2 & 3, with the same reversed number sequence as in FIGS. 2 & 3, but with the printing of the numbers inverted, in order to be more easily read with the holder inverted from the position shown in FIGS. 1–3. In FIG. 5 the tape holder is shown lowered to a position that indicates a height of 71 inches at markers 16 and 17 on respective projections 6 and 7 of tape holder 2, which would be the distance between the tape holder base and floor or platform 15 occupied by the object or person to be measured.

FIG. 6 is an end view, like that of FIG. 5, but shows the tape element, fully extended in linear fashion, by the lowering of the tape holder, and reading zero, at markers 16 and 17 on projecting portions 6 & 7 of tape holder 2, as the tape holder simultaneously touches the floor or standing platform 12, directly below the end of tape suspending bracket portion 4. As before, the proper location for attachment of the tape bracket 4,5, to the wall 13, is determined by extending the tape element 1 in this fashion, and positioning the bracket section 5 on wall 13 at a height that affords this reading of zero when tape holder 2 is in contact with floor or platform 12.

There appear to be a tendency for some to follow the conventional habit of adding any fractional reading onto the whole number nearest the markers, especially when the next lower number in the sequence is concealed. For this reason, half inch fractional markings are fully identified and the reading arrow marks 14, 15, 16 and 17 are located on projecting portions 6 and 7 of tape holder 2 to permit a more comprehensive view of the numbering sequence when reading any fractional measurement.

While this invention has been described with respect to cerain specific embodiments, it will be appreciated that many modifications and changes may be made by those skilled in the art without departing from the inventive concepts or spirit of the invention. It is intended therefore, by the appended claims, to cover all such modifications and changes as fall within the true scope of the invention.

I claim:

1. In a device for measuring height, the improvement comprising a flexible, elongated measuring element contained within a holder from which said element is extendable and to which said element is retractable, said element being adapted to permit measurement by extension of said element to be determined at said holder, said element having increments which are decreased with extension of said element and increased with retraction of said element, bracket means for securing a portion of the said device relative to a first surface and at a fixed distance from a second surface, said distance being fixed so that said element provides a determination of a linear dimension of an object when linearly extended, from the first surface, in a direction perpendicular to the second surface, so that another portion of said device contacts the object when the object is in contact with the second surface, said holder and said element, when retracted within said holder, being adapted to remain adjacent to said bracket means and away from the second surface when not in use.

2. The device as defined in claim 1, wherein said fixed distance provides a determination of zero measurement when linearly extended, perpendicular to said second surface to contact said another portion.

3. The device as defined in claim 2, in which the said flexible element has an extendable end and said portion of the said device is located at the said extendable end of the said flexible element.

4. The device as defined in claim 2, in which the said portion of the said measuring device is defined by said holder from which said element is extendable.

5. In a device for measuring including a measuring tape having numerical indications of measurement and a holder from which said tape is extendable and to which said tape is retractable and wherein readings of said numerical indications are made at said holder, the improvement wherein said numerical indications of measurement provide readings of measurement, at said holder, that increase with retraction of said tape and decrease with extension of said tape.

6. The device as defined in claim 5 in which one said indication of measurement is zero, when near full extension, said device further including a mounting means for affixing said measuring tape to and spaced from a wall, said tape being mounted so that it is extendable to a floor below it, said tape being mounted at a height on the wall and from the floor, at which said tape, linearly extended at right angles to the plane of the floor, and extended to the extent providing said one indication when an end reaches the floor, so that the said tape, when extended to touch a head of a person, standing upright on the floor, beneath said tape, can provide a measurement of the person's height, at another portion of said tape spaced from said one indication.

7. In a device for measuring height, including an elongated element within a holder said element having an end extendable from said holder and an end secured within said holder, the improvement wherein said element has a numerical indication of measurement at said holder that decreases with extension of said element and increases with retraction of said element so that said element indicates height of a subject when a portion of said device is affixed to a wall, at a fixed distance from a position on a floor at a right angle to said floor and said element linearly extended toward said floor so that another portion of said device touches the subject while the subject is on the position on the floor.

8. The device as defined in claim 7 in which said flexible element is a measuring tape with numerical values of measurement that are printed on said tape and in which the values of measurement are adapted to be read at said holder, said values being made to read larger with retraction of said tape and smaller with extension of said tape.

9. The device as defined in claim 7, in which said fixed distance is defined as that distance which corresponds to the length of said tape, linearly extended to read zero, upon contact with the floor.

10. The device as defined in claim 9, in which the said one portion of said device is said holder and said another portion is said extendable end of said element.

11. The device as defined in claim 9, in which said one portion of said device is said extendable end and said another portion is said holder.

12. The device as defined in claim 9, in which said numerical indication is marked on said tape element.

13. The device as defined in claim 8, in which said tape element has two sides and in which the same number sequence is printed on both of said sides, with the numerals in said sequence printed on one of said sides being inverted with reference to those printed on another of said sides.

* * * * *